United States Patent
Verbeure et al.

(10) Patent No.: US 9,786,255 B2
(45) Date of Patent: Oct. 10, 2017

(54) DYNAMIC FRAME REPETITION IN A VARIABLE REFRESH RATE SYSTEM

(71) Applicant: NVIDIA Corporation, Santa Clara, CA (US)

(72) Inventors: Tom Verbeure, Sunnyvale, CA (US); Robert Jan Schutten, San Jose, CA (US); Gerrit A. Slavenburg, Fremont, CA (US); Thomas F. Fox, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/720,563

(22) Filed: May 22, 2015

(65) Prior Publication Data

US 2015/0348509 A1    Dec. 3, 2015

Related U.S. Application Data

(60) Provisional application No. 62/005,928, filed on May 30, 2014.

(51) Int. Cl.
*G09G 5/18* (2006.01)
*G09G 5/12* (2006.01)
*G09G 5/391* (2006.01)
*H04N 5/04* (2006.01)
*G09G 3/32* (2016.01)
(Continued)

(52) U.S. Cl.
CPC .............. *G09G 5/18* (2013.01); *G06T 1/20* (2013.01); *G09G 3/32* (2013.01); *G09G 3/3611* (2013.01); *G09G 5/003* (2013.01); *G09G 5/12* (2013.01); *G09G 5/393* (2013.01); *H04N 9/3188* (2013.01); *G09G 3/003* (2013.01); *G09G 2340/0435* (2013.01); *G09G 2360/08* (2013.01); *G09G 2360/121* (2013.01);
(Continued)

(58) Field of Classification Search
None
See application file for complete search history.

(56) References Cited

U.S. PATENT DOCUMENTS 8,120,621 B1 *   2/2012   Ogrinc .................... G09G 5/36
                                                            345/211
8,194,065 B1 *   6/2012   Walker .................... G09G 3/20
                                                            345/211
(Continued)

FOREIGN PATENT DOCUMENTS

CN          1984304 A       6/2007
CN          103714559 A     4/2014

OTHER PUBLICATIONS

Office Action from Chinese Application No. 201510290521.X, dated Jun. 19, 2017.

*Primary Examiner* — Dismery Mercedes
(74) *Attorney, Agent, or Firm* — Zilka-Kotab, PC

(57) ABSTRACT

A method, computer program product, and system for adjusting a dynamic refresh frequency of a display device are disclosed. The method includes the steps of obtaining a current frame duration associated with a first image, computing, based on the current frame duration, a repetition value for a second image, and repeating presentation of the second image on a display device based on the repetition value. The logic for implementing the method may be included in a graphics processing unit or within the display device itself.

20 Claims, 8 Drawing Sheets

(51) Int. Cl.
*G06T 1/20* (2006.01)
*G09G 3/36* (2006.01)
*G09G 5/00* (2006.01)
*G09G 5/393* (2006.01)
*H04N 9/31* (2006.01)
*G09G 3/00* (2006.01)

(52) U.S. Cl.
CPC ... *G09G 2360/18* (2013.01); *G09G 2370/022* (2013.01); *H04N 5/04* (2013.01)

(56) References Cited

U.S. PATENT DOCUMENTS

| | | | | |
|---|---|---|---|---|
| 8,291,460 | B1* | 10/2012 | Peacock | H04N 7/188 725/90 |
| 8,334,857 | B1* | 12/2012 | Ogrinc | G09G 5/377 345/204 |
| 8,488,043 | B2* | 7/2013 | Murata | H04N 1/0044 348/222.1 |
| 8,933,915 | B2* | 1/2015 | Peng | G09G 3/20 345/204 |
| 2004/0252115 | A1* | 12/2004 | Boireau | G09G 3/2003 345/211 |
| 2007/0091204 | A1* | 4/2007 | Koshimizu | G09G 5/36 348/441 |
| 2008/0055318 | A1* | 3/2008 | Glen | G09G 3/20 345/501 |
| 2009/0327777 | A1* | 12/2009 | Vasquez | G09G 3/3611 713/320 |
| 2010/0164966 | A1* | 7/2010 | Sakariya | G09G 3/20 345/520 |
| 2012/0206467 | A1* | 8/2012 | Shih | G09G 3/344 345/545 |
| 2012/0300123 | A1* | 11/2012 | Lares | G06F 3/0488 348/441 |
| 2013/0106810 | A1* | 5/2013 | Kim | G06F 1/3265 345/204 |
| 2013/0141642 | A1* | 6/2013 | Wu | G06F 3/1407 348/441 |
| 2013/0328894 | A1* | 12/2013 | Moore | H04N 21/41407 345/522 |
| 2014/0002465 | A1* | 1/2014 | Kwa | G06T 1/20 345/502 |
| 2014/0002739 | A1* | 1/2014 | Kwa | H04N 5/46 348/536 |
| 2014/0055476 | A1* | 2/2014 | Wang | G09G 5/003 345/547 |
| 2014/0201101 | A1 | 7/2014 | Morrison | |
| 2014/0204101 | A1* | 7/2014 | Ramadoss | G06T 1/20 345/522 |
| 2014/0368519 | A1* | 12/2014 | Wood | G09G 5/391 345/545 |
| 2015/0109286 | A1* | 4/2015 | Verbeure | G09G 3/3406 345/419 |
| 2015/0161756 | A1* | 6/2015 | Bono | A63F 13/25 345/520 |
| 2015/0194111 | A1 | 7/2015 | Slavenburg et al. | |

* cited by examiner

DYNAMIC FRAME REPETITION IN A VARIABLE REFRESH RATE SYSTEM

CLAIM OF PRIORITY

This application claims the benefit of U.S. Provisional Application No. 62/005,928 titled "Dynamic Frame Repetition in a Variable Refresh Rate System," filed May 30, 2014, the entire contents of which is incorporated herein by reference.

FIELD OF THE INVENTION

The present invention relates to display systems, and more particularly to a variable refresh rate display.

BACKGROUND

Conventional display devices (e.g., Cathode Ray Tube (CRT), Liquid Crystal Displays (LCD), Light Emitting Diode (LED), Organic LED (OLED), Active-Matrix OLED (AMOLED), etc.) operate at fixed refresh rates such as 60 Hz, 85 Hz, or 120 Hz. In other words, the display device is configured to refresh each of the pixels of the screen at a specific frequency. In conventional systems, the video signal transmitted to the display device must match the fixed frequency of the display device's refresh rate. Some display devices enable the fixed frequency refresh rate to be changed based on a configuration setting of the display device, but once that setting is changed, each frame received by the display device is drawn to the screen at that fixed frequency. However, a graphics processing unit (GPU) may generate frames of pixel data at a variable rendering rate that is asynchronous with the fixed refresh rate of the display device.

For example, when a display device is operating at 60 Hz, the pixels of the display will be refreshed every 16.6 ms. However, each frame may take a variable amount of time to be rendered by the GPU so while one frame may take 12 ms to render, another frame with more complicated geometry may take 30 ms to render. Thus, completely rendered frames may not be ready in the frame buffer when the next frame needs to be output to the display device via a video interface. This situation can cause image artifacts that a viewer may perceive as choppy video. For example, image tearing may occur if the image being output to the display device is switched part way through the frame (V-SYNC Off). Conversely, image stuttering may occur if the image being output to the display device is only switched between frames, thereby causing some frames to be repeated and/or causing some frames to be skipped (V-SYNC On).

Newer display devices may be configured to operate synchronously with the GPU utilizing a dynamic refresh frequency. For example, some monitors may be compatible with NVIDIA's G-SYNC™ technology that enables the display device to synchronize the refresh of pixel elements for displaying a frame with the variable rendering rate of the GPU. The GPU is configured to transmit frames of pixel data to the display device via the video interface as the frames are rendered, and the display device is configured to refresh the pixels of the display device in response to receiving the frames of pixel data rather than at a fixed frequency refresh rate. In other words, the refresh rate of the display device is not fixed at a particular frequency, but instead adjusts dynamically to the rate image data is received from the GPU.

As long as the GPU renders frames of image data at a reasonably fast rendering rate, the types of image artifacts associated with conventional systems may be reduced. However, in some cases, the GPU may have trouble rendering particular frames in a reasonable amount of time due to the complexity of a scene. For example, a particular frame of pixel data may take, e.g., 100 ms to be rendered, which corresponds to a dynamic refresh frequency of 10 Hz for that particular frame. The effective refresh rate of the monitor when there are large delays between successive frames may cause issues.

For example, most image display technologies (e.g., LCD panels) have a lower and upper bound refresh frequency at which the display can reproduce an image with maximum quality. When the displays were driven at a fixed frequency refresh rate, this operational restriction was easy to meet because the fixed refresh frequency could be selected within the lower and upper bounds of the display. However, when using a variable refresh rate technology, such as NVIDIA's G-SYNC™ technology, the GPU may require a variable and unpredictable amount of time to generate the next image data for display. The amount of time required to generate the next frame of image data for display can be larger than the amount of time available while staying above the minimum refresh frequency requirements of the display. Thus, there is a need for addressing these issues and/or other issues associated with the prior art.

SUMMARY

A method, computer program product, and system for adjusting a dynamic refresh frequency of a display device are disclosed. The method includes the steps of Obtaining a current frame duration associated with a first image, computing, based on the current frame duration, a repetition value for a second image, and repeating presentation of the second image on a display device based on the repetition value. The logic for implementing the method may be included in a graphics processing unit or within the display device itself.

DETAILED DESCRIPTION

In most variable refresh rate displays, the arrival time of each new frame of image data is unknown, and a heuristic based on past events may be used to estimate the arrival time of the next frame of image data. The estimated arrival time is utilized to find a number of times the previous frame of image data should be refreshed on the display device in order to ensure that the display device is operating within specifications provided by the display device as to a minimum and maximum refresh frequency of the display device.

Figure 1:
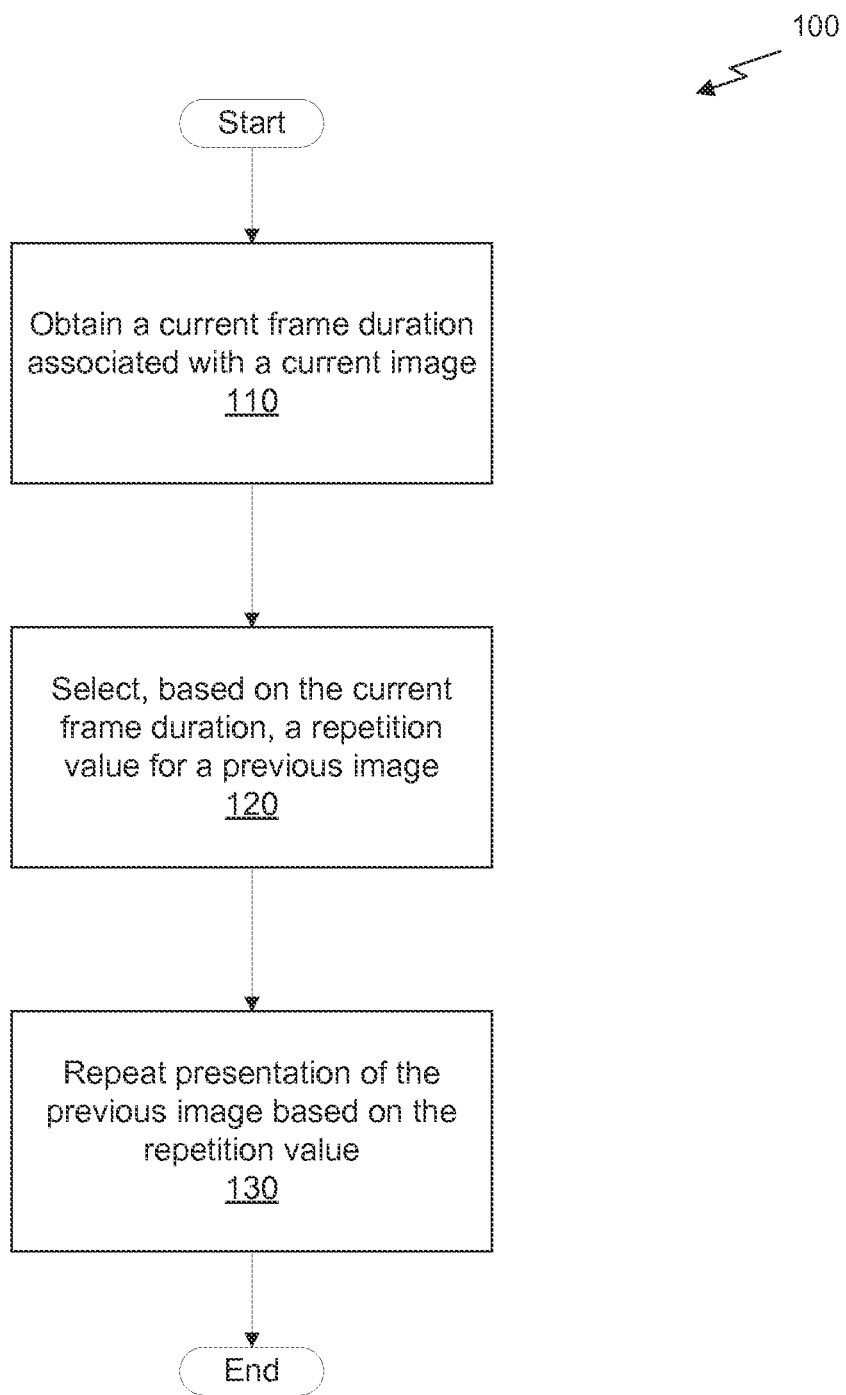
FIG. 1 illustrates a flowchart of a method for repeating presentation of image on a display device, in accordance with one embodiment.

FIG. 1 illustrates a flowchart of a method 100 for repeating presentation of an image on a display device, in accordance with one embodiment. At step 110, a current frame duration associated with a frame of image data is obtained. The current frame duration represents the time required to render the current frame of image data into a frame buffer and, consequently, the time that the previous frame of image data will be displayed by the display device while waiting for the current frame of image data to be received. The current frame duration may vary for one or more frames of image data in a sequence of images. In one embodiment, a timing controller in the display device calculates an estimate for the current frame duration. In another embodiment, a scaling unit in the display device calculates an estimate for the current frame duration. In yet another embodiment, a processor external to the display device, such as a graphics processing unit, calculates an estimate for the current frame duration.

In most variable refresh rate display devices, the arrival time of each new image will be unknown as the rendering rate of the images will vary based on the complexity of the scene being rendered. The only way the arrival time of each new image will be known is if there is a one frame delay before transmitting the previous frame to the display device such that the rendering time for the current frame is known when the previous frame is sent to the display device. However, such delay may introduce a lag that could be noticeable to some users in interactive applications such as computer games.

In one embodiment, the delay of one frame may be avoided by estimating the current frame duration using a heuristic based on past events, such as the known frame duration times of one or more previous frames of image data. For example, the frame duration associated with the previous frame of image data may be used to estimate the frame duration associated with the current frame of image data. In another example, the average frame duration associated with N previous frames of image data may be used to estimate the frame duration time for the current frame of image data.

At step 120, a repetition value for a previous image is selected based on the current frame duration. It will be appreciated that, given a specified lower bound for the refresh frequency of a display device that corresponds to a maximum allowed frame duration and a specified upper bound for the refresh frequency of the display device that corresponds to a minimum allowed frame duration, it is always possible to determine an integer number of repetitions for a frame of image data such that the dynamic refresh frequency associated with the frame of image data falls within the lower and upper bounds for the refresh frequency of the display device as long as the following equation is met:

$$(\text{frame\_duration}_{max}/\text{frame\_duration}_{min}) \geq 2 \quad \text{(Eq. 1)}$$

In Equation 1, frame_duration$_{max}$ represents the maximum allowed frame duration of the display device and frame_duration$_{min}$ represents the minimum allowed frame duration of the display device. In other words, the magnitude of the maximum allowed frame duration should be greater than or equal to twice the magnitude of the minimum allowed frame duration. For example, if a display device has a lower bound for the refresh frequency of 50 Hz and an upper bound for the refresh frequency of 135 Hz, then the result of Equation 1 is approximately 2.7 (i.e., 20 ms/7.4 ms~2.7), which is greater than 2. If the frame of image data is generated too fast, then a delay may be added before transmitting the frame of image data to the display device so that the refresh rate of the display device falls within the lower and upper bounds for the refresh frequency of the display device. However, if the frame of image data is generated too slow, then the frame of image data can be re-transmitted to the display device one or more times such that the dynamic refresh frequency of the display device falls within the lower and upper bounds for the refresh frequency of the display device. It will be appreciated that the time between each successive transmission of the frame of image data should be approximately even so that the intermediate delay between any two consecutive refreshes of the display device (i.e., the instantaneous dynamic refresh frequency) falls within the lower and upper bounds for the refresh frequency of the display device.

The actual number of times a frame of image data is repeatedly presented on the display device will depend on the rendering rate of the images as well as other considerations. For a given estimate of the current frame duration, the maximum repetition value of a previous frame of image data may be computed as:

$$R_{max} = (\text{frame\_duration}_{curr}/\text{frame\_duration}_{min}) \cdot \text{rounded\_down} - 1 \quad \text{(Eq. 2)}$$

In Equation 2, $R_{max}$ is the maximum repetition value for the previous frame of image data, frame_duration$_{curr}$ represents the current frame duration, and frame_duration$_{min}$ represents the minimum allowed frame duration of the display device. The operator rounded_down simply rounds the intermediate result of the division operation down to the nearest integer value. By rounding down, the maximum repetition value represents an integer number of times that an image frame may be repeated within a given frame duration that corresponds to a dynamic refresh frequency below the upper bound for the refresh frequency of the display device.

Similarly, for a given estimate of the current frame duration, the minimum repetition value of a previous frame of image data may be computed as:

$$R_{min} = (\text{frame\_duration}_{curr}/\text{frame\_duration}_{max}) \cdot \text{rounded\_up} - 1 \quad \text{(Eq. 3)}$$

In Equation 3, $R_{min}$ is the minimum repetition value for the previous frame of image data, frame_duration$_{curr}$ represents the current frame duration, and frame_duration$_{max}$ represents the maximum allowed frame duration of the display device. The operator rounded_up simply rounds the result of the division operation up to the nearest integer value. By rounding up, the minimum repetition value represents an integer number of times that an image frame may be repeated within a given frame duration that corresponds to a dynamic refresh frequency above the lower bound for the refresh frequency of the display device.

It will be appreciated that the maximum repetition value computed based on Equation 2 and the minimum repetition value computed based on Equation 3 do not include the initial presentation of the previous frame of image data on the display device and only represents the number of times the previous frame of image data should be repeatedly refreshed on the display device. In another embodiment, the "minus one" portion of Equations 2 & 3 may be removed such that the maximum repetition value and minimum repetition value represent a total number of times the previous frame of image data will be refreshed on the display device, including the initial presentation of the previous frame of image data as well as all subsequent presentations of the previous frame of image data.

The repetition value may be selected as any integer within the range of [$R_{min}$, $R_{max}$], inclusive. In one embodiment, the repetition value is selected as the maximum repetition value. The maximum repetition value will correspond with the largest dynamic refresh frequency of the display device when repeating the refresh of the display device with a particular frame of image data an integer number of times within a given frame duration, where the duration between any two successive refreshes is equally distributed. In another embodiment, the repetition value is selected as the minimum repetition value in order to minimize the chance of collisions with new image frames.

In yet another embodiment, the repetition value is selected as some value between the minimum repetition value and the maximum repetition value. The computed maximum repetition value or minimum repetition value do not necessarily have to be the actual number of times that the previous frame of image data is refreshed on the display device. In some cases, where there is a large disparity between the maximum allowed frame duration of the display device and the minimum allowed frame duration of the display device, there may be multiple integer values that represent the number of times a frame of image data could be repeated within a given duration where the resulting dynamic refresh frequency of the display device would fall within the lower and upper bounds for the refresh frequency of the display device. The actual number of repetitions chosen for a frame of image data may depend on other considerations.

One such consideration is a trade-off between image quality and the chance of a collision between repeating the previous frame of image data while simultaneously receiving the current frame of image data. Most display devices do not have a way to abort an on-going presentation of an image. So, if a new image is received while a previous image is being refreshed, then the previous image must be fully presented before the new image can be presented on the display device. The delay between receiving the current frame of image data and finishing the presentation of the previous frame of image data may result in some amount of noticeable stutter in the resulting video stream. Higher dynamic refresh frequencies associated with higher repetition values will increase the chance of collisions, but higher dynamic refresh frequencies are typically associated with higher quality video. Therefore, there is a trade-off between selecting the highest possible dynamic refresh frequency and the chance of introducing some amount of stutter.

In one embodiment, other considerations may include monitoring the frequency of collisions associated with previous image frames and decreasing the repetition value below the maximum repetition value once the frequency of collisions rises above a threshold value. In another embodiment, other considerations may include monitoring a variance in the frame durations associated with a plurality of image frames and decreasing the repetition value below the maximum repetition value when the variance is above a threshold value. For example, for computer games that produce image frames with steady frame duration, the maximum repetition value may be optimal, but for computer games that produce image frames with erratic frame duration, less than the maximum repetition value may be better.

At step 130, the presentation of the previous image is repeated based on the repetition value. In one embodiment, logic that drives the display of the frame of image data repeats the presentation of the previous image a number of times such that the dynamic refresh frequency of the display device falls within the lower and upper bounds for the refresh frequency of the display device. In one embodiment, the display controller within the GPU may retransmit the previous frame of image data to the display device by re-encoding the pixel data for the previous frame of image data in the video signal. In another embodiment, the display device may store the previous frame of image data locally, and the display device, either through the scaling unit or the timing controller, may cause the screen of the display device to refresh the pixels with the previous frame of image data a number of times.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
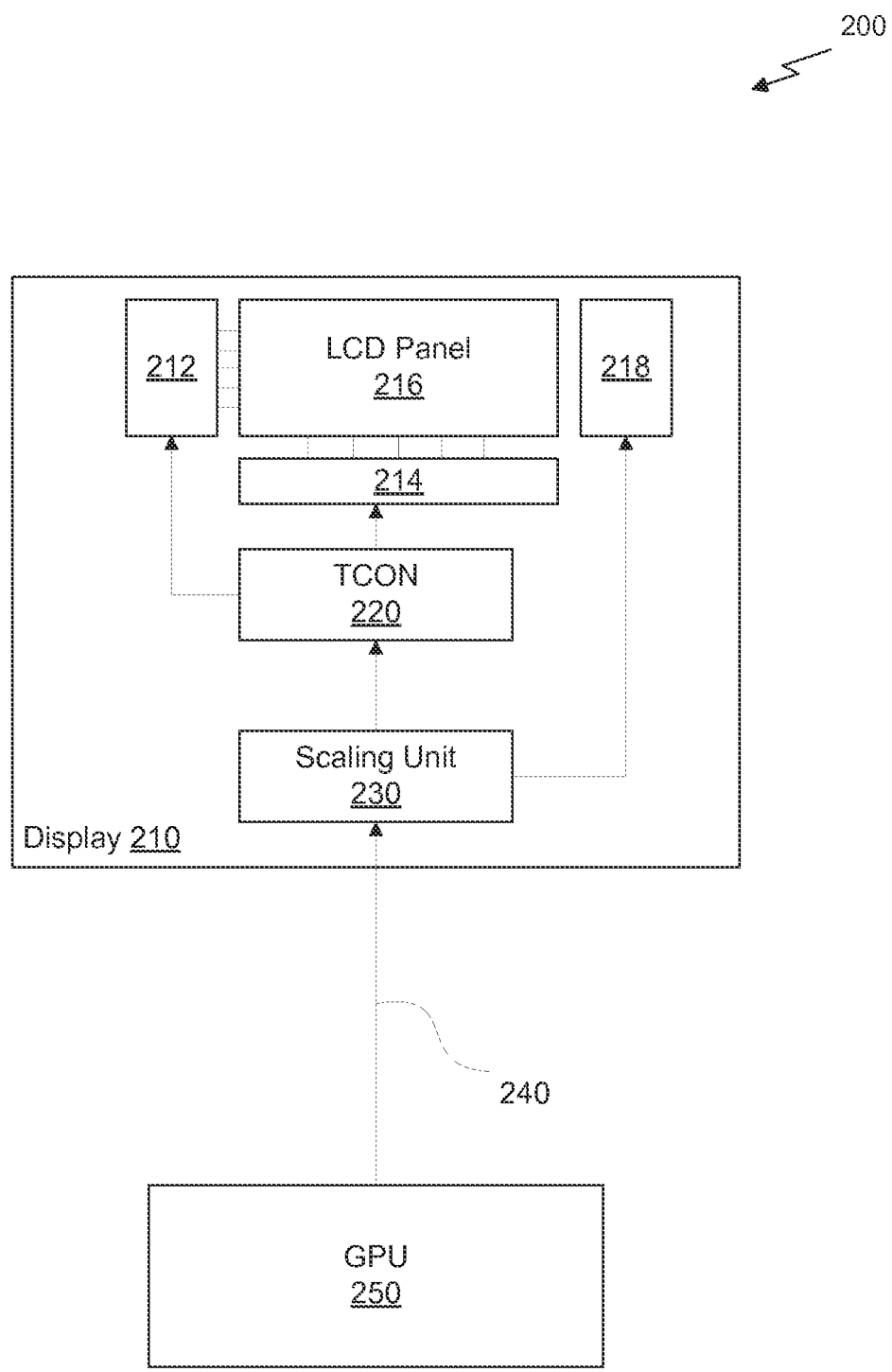
FIG. 2 illustrates a system that includes a dynamic refresh frequency capable display, in accordance with one embodiment.

FIG. 2 illustrates a system 200 that includes a dynamic refresh frequency capable display 210, in accordance with one embodiment. In one embodiment, the display 210 includes an LCD panel 216 that includes a plurality of pixel elements, each pixel element comprising a plurality of liquid crystal elements corresponding to a plurality of color components (e.g., a red component, a green component, and a blue component). The display 210 may also include row drivers 212 and column drivers 214 for controlling each of the pixel elements in the LCD panel 216. The row drivers 212 and column drivers 214 enable each individual pixel element in the LCD panel 216 to be addressed and each liquid crystal element of the pixel element to have a voltage applied thereto in order to vary a level of the corresponding color component displayed by the pixel element.

The display 210 also includes a backlight 218, which may comprise one or more compact fluorescent lights (CFLs) arranged around the edge or edges of the LCD panel 216, one or more LEDs arranged around the edge or edges of the LCD panel 216, or an array of LEDs arranged behind the pixel elements of the LCD panel 216. It will be appreciated that, in some embodiments, the display 210 may be an OLED panel or AMOLED panel that does not include the backlight 218.

The display 210 may also include a timing controller (TCON) 220 and a scaling unit 230. The TCON 220 controls the row drivers 212 and the column drivers 214 in order to display the frames of image data on the LCD panel 216. The scaling unit 230 receives a video signal from a GPU 250 via a video interface 240. The video signal may correspond to a particular video signal format, such as a digital video signal format or an analog video signal format. Exemplary digital video signal formats include DVI (Digital Visual Interface), HDMI (High-Definition Multimedia Interface), and the like. Exemplary analog video signal formats include NTSC (National Television System Committee), PAL (Phase Alternating Line), VGA (Video Graphics Array), and the like.

The particular video signal received via the video interface 240 may have a resolution that does not match a native resolution of the LCD panel 216. Thus, the scaling unit 230 is configured to scale the image frames encoded within the video signal to match the native resolution of the LCD panel 216. The scaling unit 230 may be configured to scale the image frames in the horizontal direction and/or the vertical direction. In one embodiment, the scaling unit 230 may filter the image frames. In yet another embodiment, where display 210 comprises a direct drive monitor or an LCD panel 216 included in a laptop computer, display 210 may not include a scaling unit 230.

The scaling unit 230 may also control the backlight 218. For example, the scaling unit 230 may determine a particular level of illumination the backlight 218 should provide for a given frame of image data and control the backlight 218 to provide the particular level of illumination. In an alternate embodiment, the display 210 may include a separate circuit that controls the backlight 218 such that the scaling unit 230 does not control the backlight 218.

The GPU 250 may render frames of image data based on 3D primitives defined by an application executing on a CPU (not explicitly shown). The frames of image data may include pixel data stored in a frame buffer, which is a portion of memory allocated to store pixel data that is utilized to generate the video signal transmitted over the video interface 240. In one embodiment, the GPU 250 may be associated with a dual frame buffer (or ping-pong buffer) that includes a first portion of the frame buffer that stores pixel data for a previously rendered frame that is read out of memory and encoded within the video signal transmitted via the video interface 240 and a second portion of the frame buffer that stores pixel data for the current frame being rendered by the GPU 250. Once the GPU 250 has completed rendering of the current frame, the roles of the first portion of the frame buffer and the second portion of the frame buffer may be switched such that the second portion of the frame buffer stores pixel data for the recently rendered frame that is read out of memory and encoded within the video signal transmitted via the video interface 240 and the first portion of the frame buffer stores pixel data for the next frame being rendered by the GPU 250. The roles of the first and second portion of the frame buffer may alternate after each frame is rendered.

Figure 3A:
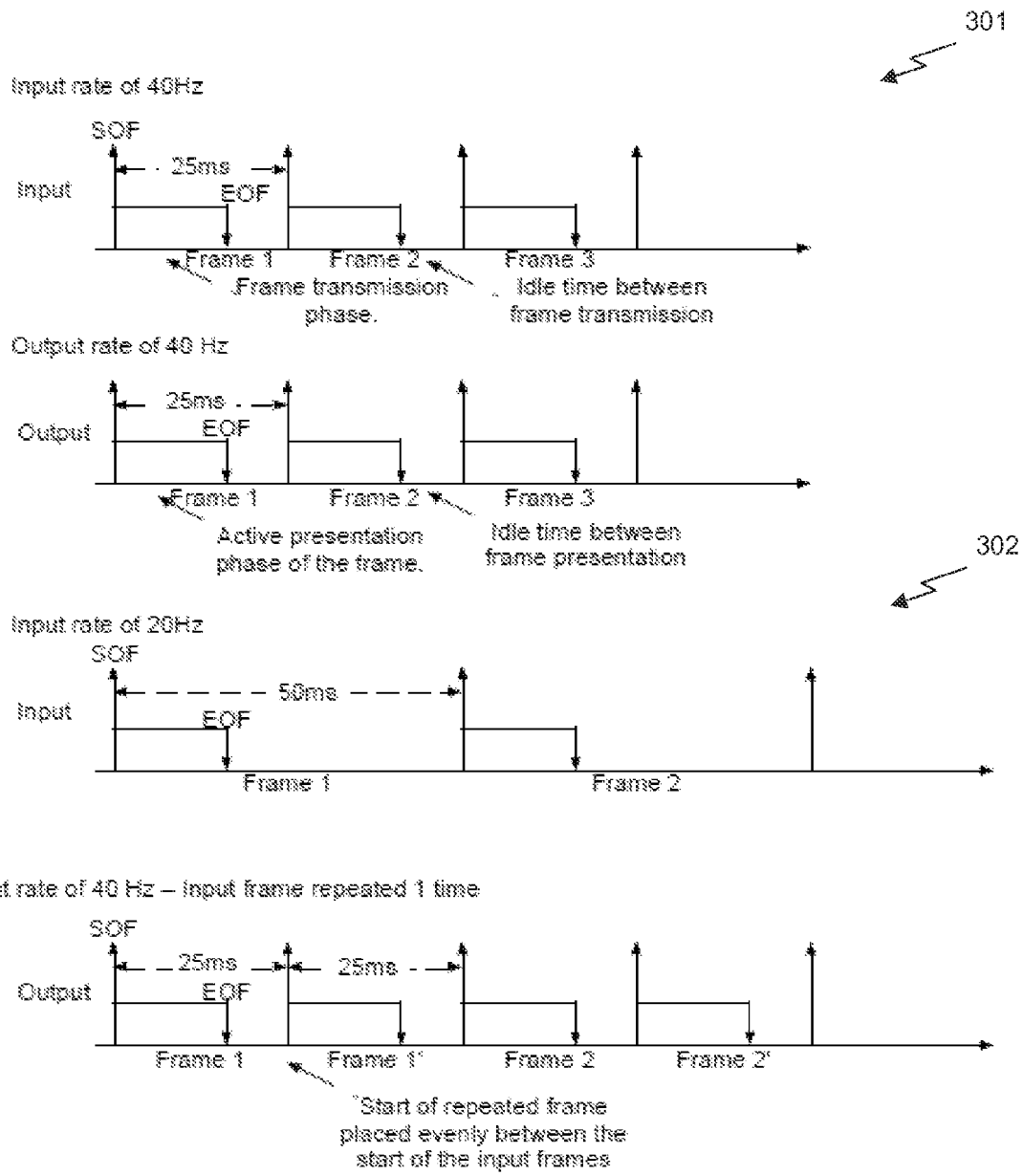
FIGS. 3A and 3B illustrate an example of frame repetition with a minimum refresh frequency of 30 Hz, in accordance with one embodiment.
Figure 3B:
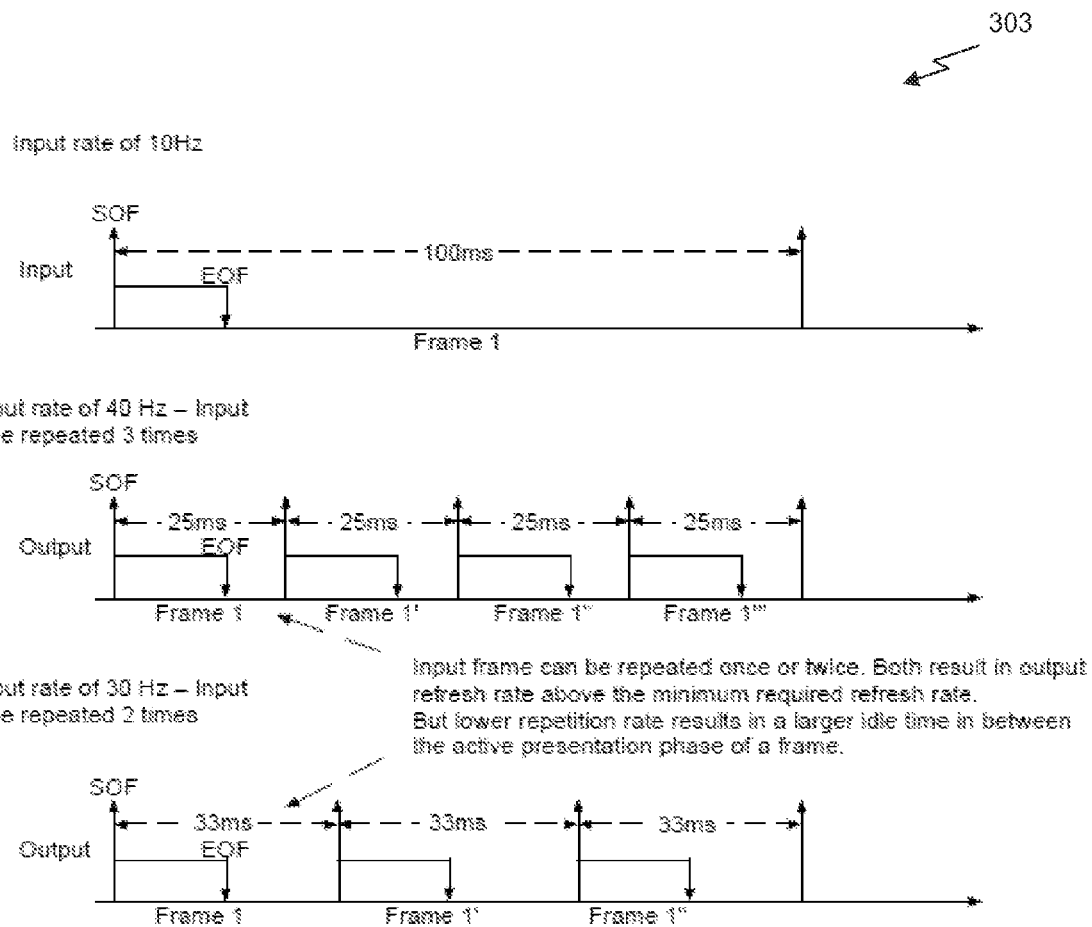

FIGS. 3A and 3B illustrate an example of frame repetition with a minimum refresh frequency of 30 Hz, in accordance with one embodiment. A display device, such as display 210, may have a minimum refresh frequency of 30 Hz and a maximum refresh frequency of 125 Hz. As shown in a first set of timing diagrams 301 in FIG. 3A, a sequence of frames of image data may be generated by the GPU 250 and transmitted to the display 210 via the interface 240. A first frame is transmitted to the display 210 during a first portion of the first frame duration (i.e., a time between receiving the start of the first frame of image data and a start of receiving the second frame of image data). The "EOF" label represents an end-of-frame indicator in the video signal. The end-of-frame indicator makes clear that the entire frame of image data may be transmitted at a particular fixed frequency associated with the interface 240 and, therefore, the frame of image data may finish transmission before the end of the first frame duration. The time between receiving the end-of-frame indicator for the current frame of image data and the start of the next frame of image data within the video signal may be referred to as idle time where image data is not received via the interface 240.

As shown in FIG. 3A, the first set of timing diagrams 301 includes an input signal. The input signal includes encoded data for three image frames received by the display 210, each frame of image data arriving approximately every 25 ms, which corresponds to a dynamic refresh frequency of 40 Hz. Because the minimum refresh frequency of the display is 30 Hz, the frames of image data received at the display 210 correspond with a dynamic refresh frequency that is greater than the lower bound for the refresh frequency of the display 210 (i.e., 30 Hz) and less than the upper bound for the refresh frequency of the display 210 (i.e., 125 Hz). Therefore, the frames of image data encoded within the input signal may be presented on the LCD panel 216 as the frames of image data are received, as illustrated by the output signal included in the first set of timing diagrams 301. In other words, none of the frames of image data need to be presented on the LCD panel 216 (i.e., refreshed) multiple times in order to meet the requirement of being presented at a dynamic refresh frequency within the lower and upper bounds for the refresh frequency of the display 210.

In contrast, a second sequence of frames of image data may be generated by the GPU 250 at a lower rate. A second set of timing diagrams 302 in FIG. 3A includes an input signal that includes encoded data for two image frames received by the display 210, each frame of image data arriving approximately every 50 ms, which corresponds to a dynamic refresh frequency of 20 Hz. Because the lower bound for the refresh frequency of the display is 30 Hz, the frames of image data received in the input signal correspond to a dynamic refresh frequency that is less than the lower bound for the refresh frequency of the display 210 (i.e., 30 Hz). Therefore, each frames of image data encoded in the input signal will need to be presented on the LCD panel 216 multiple times, as illustrated by the output signal included in the second set of timing diagrams 302. In this example, each frame of image data may be refreshed to the LCD panel 216 one additional time (i.e., one repetition) to result in an effective dynamic refresh frequency of the display 210 of 40 Hz, when compared to the input frame rate of 20 Hz. It will be appreciated that the repetition value illustrated by the second set of timing diagrams is 1, which falls within the range of [1, 5], where $R_{min}$ is 1 (i.e., (50 ms/33.3 ms)·rounded_up−1=1) and $R_{max}$ is 5 (i.e., (50 ms/8 ms)·rounded_down−1=5). As shown, 33.3 ms is an approximate value that refers to $\frac{1}{30}^{th}$ of a second corresponding to the minimum refresh frequency of 30 Hz.

As shown in FIG. 3B, in some instances the duration between consecutive frames in the input signal may be so large that the frames of image data may need to be repeatedly refreshed on the LCD panel 216 more than one time in order to meet the requirements of staying within the lower and upper bounds for the refresh frequency of the display 210. For example, as shown in the input signal included in a third set of timing diagrams 303, a first frame duration may be 100 ms, which corresponds to a dynamic refresh frequency of 10 Hz—well below the minimum refresh frequency of the display 210. In order to meet the requirements of staying within the lower and upper bounds for the refresh frequency of the display 210, the first frame of image data may be repeated a number of times within the range [2, 11], where $R_{min}$ is 2 (i.e., (100 ms/33.3 ms)·rounded_up−1=2) and $R_{max}$ is 11 (i.e., (100 ms/8 ms)·rounded_down−1=11). A first output signal included in the third set of timing diagrams 303 shows the first frame of image data being repeated three times, corresponding to an effective dynamic refresh frequency of 40 Hz. A second output signal included in the third set of timing diagrams 303 shows the first frame of image data being repeated two times, corresponding to an effective dynamic refresh frequency of 30 Hz. Both output signals included in the third set of timing diagrams 303 meet the requirements of the display 210.

Although not shown explicitly, other frames may follow the frames shown in the input signals in each of the three sets of timing diagrams. Furthermore, although each frame is shown as being repeated in a manner associated with a constant dynamic refresh frequency, it will be appreciated that the time delay between frames may be variable and the frames for a particular input signal may be repeated a different number of times to accommodate varying dynamic refresh frequencies.

Figure 4:
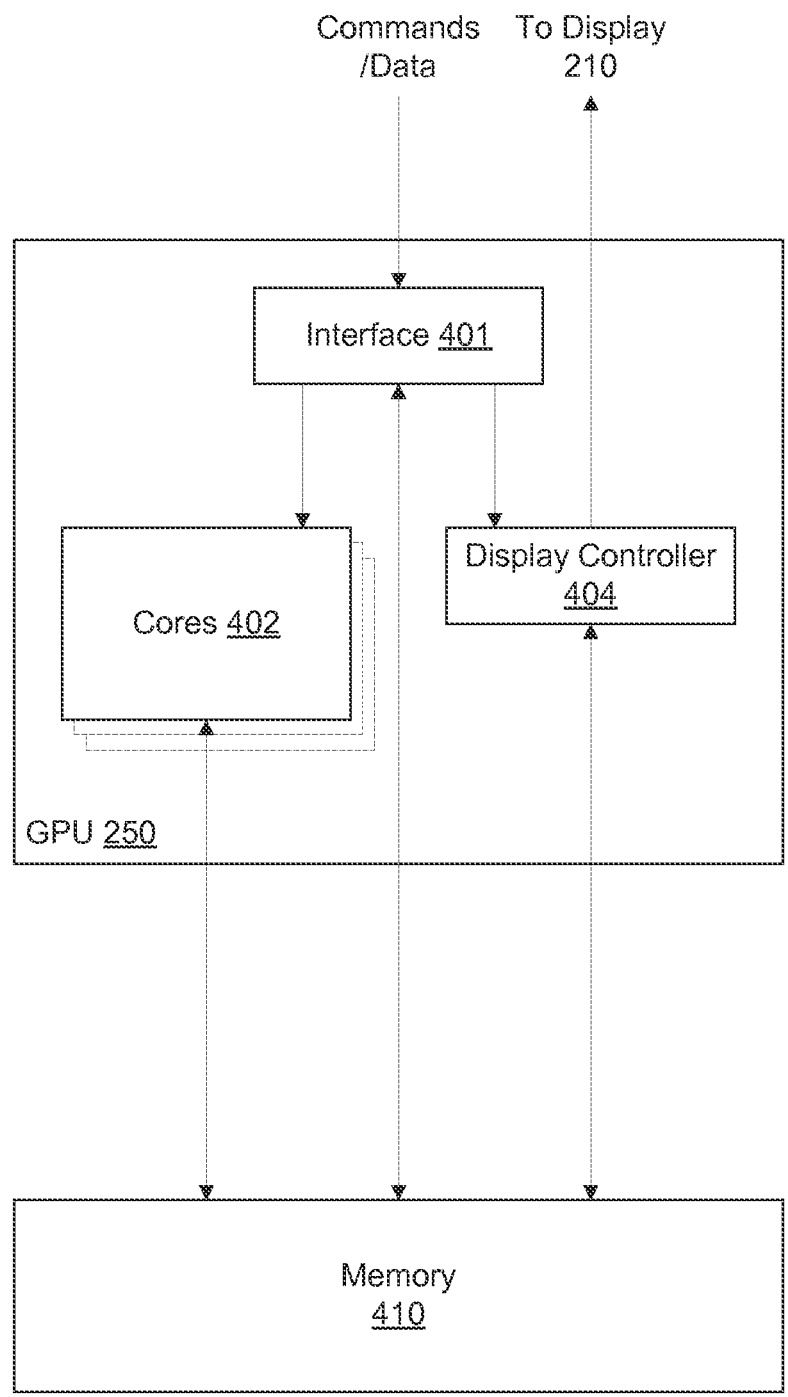
FIG. 4 illustrates the operation of the GPU of FIG. 2, in accordance with one embodiment.

FIG. 4 illustrates the operation of the GPU 250 of FIG. 2, in accordance with one embodiment. In one embodiment, the GPU 250 monitors the rendering rate of frames of image data generated by the GPU 250 and adjusts the effective dynamic refresh frequency of the display 210 by repeatedly transmitting each frame of image data to the display 210 one or more times. In such an embodiment, the logic for adjusting the dynamic refresh frequency of the display 210 is implemented in the GPU 250, either within a dedicated hardware unit, a programmable logic unit executing instructions included in a software program, or some combination of hardware and software.

As shown in FIG. 4, the GPU 250 may be connected to a memory 410. The memory 410 may be a synchronous dynamic random access memory (SDRAM) configured to store data accessible to the GPU 250. In one embodiment, the memory 410 is a dedicated video memory that is only accessible by the GPU 250. In another embodiment, the memory 410 is a system memory that is shared between a CPU and the GPU 250.

The GPU 250 may receive commands and data from a CPU via the interface 401. The interface 401 may be, e.g., a PCIe (Peripheral Component Interconnect Express) interface that enables the GPU 250 to communicate with the CPU and/or a system memory via a bus (not explicitly shown). The GPU 250 may also include one or more cores 402 that process the data based on the commands. Each core 402 may be multi-threaded to process multiple data in parallel. In one embodiment, the cores 402 have a SIMD (Single-Instruction, Multiple Data) architecture. In SIMD architectures, a plurality of processing units process different data based on the same instruction. In another embodiment, the cores 402 have a MIMD (Multiple instruction, Multiple Data) architecture. In MIMD architectures, a plurality of processing units process different data based on different instructions scheduled on each processing unit. In yet another embodiment, the cores 402 have a SIMD (Single-Instruction, Multiple-Thread architecture. In SIMT architectures, a plurality of processing units process a plurality of related threads, each thread having the same instructions configured to process different data, but each thread capable of branching independently. In other words, individual threads may be masked to prevent execution of certain instructions in SIMT architectures. This enables conditional execution of the instructions associated with the plurality of threads. The GPU 250 may also include a display controller 404 that is configured to generate the video signal over the interface 240 according to the specification of a particular video signal interface. The display controller 404 may read the image data from a frame buffer in the memory 410 and convert the values stored in the frame buffer into signals transmitted via the interface 240.

In one embodiment, the GPU 250 may be configured to implement the method 100 of FIG. 1. More specifically, the GPU 250 may render frames of image data based on commands and data received from a CPU over the interface 401. The GPU 250 may store the rendered frames of image data in the frame buffer in the memory 410. After each frame of image data is rendered, the GPU 250 may generate a video signal transmitted over the interface 240 to cause the frame of image data to be presented on the display 210. Each frame of image data rendered to the frame buffer may be encoded into the video signal one or more times in order to adjust the dynamic refresh frequency of the display 210.

The GPU 250 may encode the previous frame of image data into the video signal to cause an initial presentation of the previous image frame on the LCD panel 216 of the display 210. Instead of waiting for the current frame of image data to be completely rendered into the frame buffer in order to encode the next image frame into the video signal, the GPU 250 may determine whether the previous frame of image data should be repeated. In other words, the GPU 250 may be configured to estimate the current frame duration associated with a current image frame being rendered into the frame buffer by the GPU 250 and then repeat the encoding of the previous frame of image data in the video signal based on the estimated current frame duration. The GPU 250 may use a heuristic to estimate the current frame duration. For example, the heuristic may be based on information related to the known frame durations for one or more previous frames of image data. As used herein, the term "frame duration" may refer to the time that a particular frame of image data is presented on the LCD panel 216 of the display 210, which correlates with the time required for the GPU 250 to render the next frame of image data. The GPU 250 may estimate the current frame duration using any available technique.

In one embodiment, the GPU 250 stores a timestamp associated with each frame of image data rendered to the frame buffer. For example, a last command associated with the rendering of each frame may access a system clock and store a time represented by the system clock in a register, a local shared memory (e.g., Static RAM or SRAM included on the silicon substrate of the GPU 250), or an external memory such as the memory 410. The timestamps may be utilized to calculate a time between rendering any two frames of image data.

In one embodiment, the GPU 250 may determine an estimate for the current frame duration by calculating a rendering time associated with the previous frame of image data. In one embodiment, the rendering time is calculated by subtracting a timestamp associated with the previous frame of image data from a timestamp associated with frame of image data that immediately preceded the previous frame of image data. The rendering time required to render two adjacent frames of image data in a video stream is similar when the content of the two image frames is similar and the processing of the content is similar which is very often the case. Therefore, the rendering time for the previous frame of image data may provide a good estimate for the rendering time for the current frame of image data, which is representative of the current frame duration.

In another embodiment, the GPU 250 may determine an estimate for the current frame duration by calculating an average rendering time associated with N frames of image data. The average rendering time represents a moving average based on the rendering times associated with the last N frames of image data. The average rendering time, in this embodiment, may be calculated by finding a difference between a timestamp associated with an $N^{th}$ frame of image data in the plurality of frames of image data from a timestamp associated with the previous frame of image data in the plurality of frames of image data and dividing the difference by the value of N. It will be appreciated that the N frames are N adjacent frames of image data and that the previous frame of image data is presented on the display 210

N−1 frames after the $N^{th}$ frame of image data. The average rendering time may be selected as an estimate for the current frame duration.

Other heuristics may be used to calculate an estimate for the current frame duration. For example, the frame duration associated with the previous frame may be multiplied by a factor (e.g., 90%, 105%, etc.) to adjust the estimate of the current frame duration to allow for slight variations in the rendering time between different frames of image data. Other methods for estimating the current frame duration are contemplated as being within the scope of the present disclosure.

Once the GPU 250 has calculated an estimate for the current frame duration, the GPU 250 may select a repetition value that falls within the minimum and maximum repetition values according to Equations 2 & 3, set forth above. In one embodiment, the GPU 250 may retrieve the minimum and maximum allowed frame durations of the display 210 from EDID (Extended Display Identification Data) information transmitted by the display 210 to the GPU 250 via the interface 240. In another embodiment, the GPU 250 may be associated with a driver that is configured to retrieve the minimum and maximum allowed frame durations for the display 210 from a memory. The minimum and maximum allowed frame durations may be entered manually by a user when configuring the driver, retrieved automatically via a network connection such as the Internet, or included in a database associated with the driver that associates different displays with different minimum and maximum allowed frame durations according to manufacturer specifications.

After the GPU 250 has calculated the minimum and maximum repetition values and selected a repetition value within that range, the GPU 250, via the display controller 404, may retransmit the previous frame of image data to the display 210 by encoding the previous frame of image data in the video signal over the interface 240. The GPU 250 may repeatedly transmit the previous frame of image data to the display 210 based on the repetition value. In one embodiment, the GPU 250 retransmits the previous frame of image data over the interface 240 a number of times equal to the maximum repetition value.

It will be appreciated that the number of times that the previous frame of image data is to be presented on the display 210 is unknown when the current frame of image data is being rendered because the final rendering time for the current frame of image data is unknown. The estimate for the current frame duration is simply a guess as to how long the previous frame of image data will be presented by the display 210. When the current frame duration is estimated incorrectly and the current frame of image data has been rendered to the frame buffer faster than expected, the previous frame of image data may not be repeated as many times as initially planned and the current frame of image data will be presented by the display 210 as soon as possible. Similarly, when the current frame duration is estimated incorrectly and the current frame of image data has not been rendered to the frame buffer by the expected time, the previous frame of image data may be repeated more times than initially planned (i.e., more than the number of times given by the repetition value).

Figure 5:
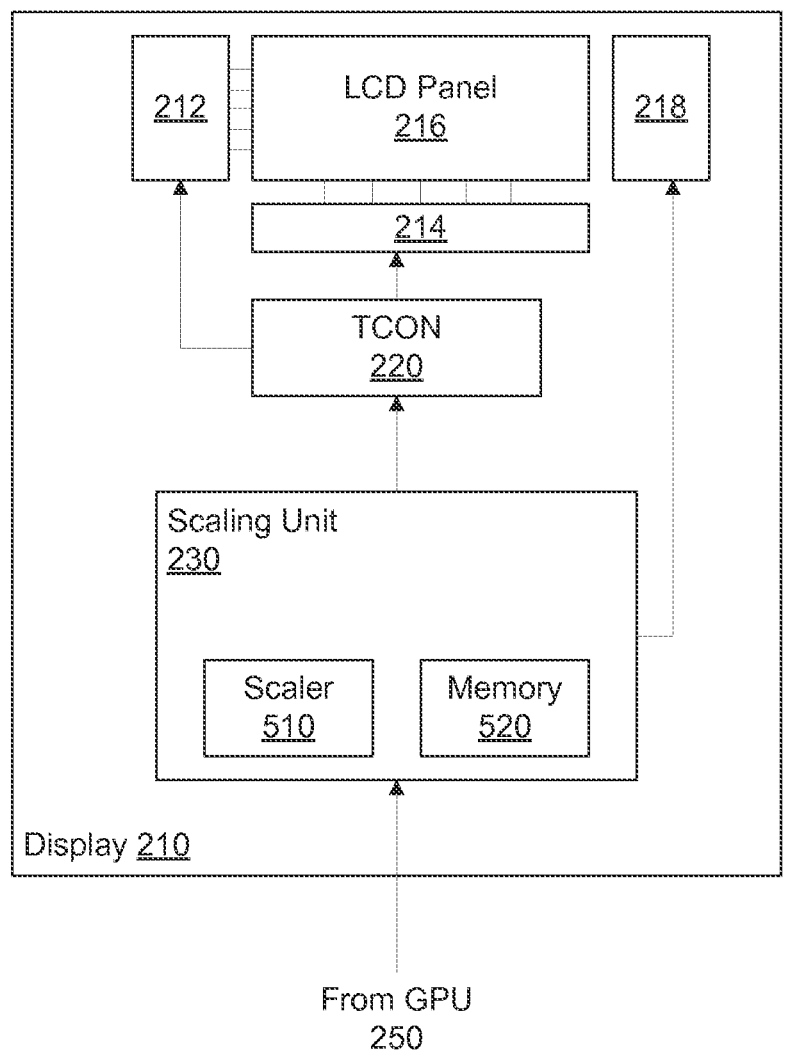
FIG. 5 illustrates the operation of the scaling unit of FIG. 2, in accordance with another embodiment.

FIG. 5 illustrates the operation of the scaling unit 230 of FIG. 2, in accordance with another embodiment. In another embodiment, the logic for ensuring that the display device refreshes the LCD panel 216 within the lower and upper bounds for the refresh frequency of the display device is implemented within the display device. For example, the display 210 may be configured to adjust the dynamic refresh frequency of the display 210 by repeatedly causing the LCD panel 216 to be refreshed with the image data for the previous image frame in order to keep the dynamic refresh frequency within the lower and upper bounds for the refresh frequency of the display 210. In such an embodiment, the GPU 250 may simply transmit each image frame to the display 210 one time over the interface 240 and then the display 210 handles the logic for repeating the presentation of the image frames. In one embodiment, the logic is implemented in the scaling unit 230.

Again, the scaling unit 230 is configured to scale the frames of image data encoded in the video signals received via the interface 240 to match a native resolution of the display 210. As shown in FIG. 5, the scaling unit 230 may include a scaler 510 and a local memory 520. The scaling unit 230 may be a fixed function hardware unit embodied on an ASIC (application specific integrated circuit) included in the display 210. In another embodiment, the scaling unit 230 may be included on a larger ASIC that includes the TCON 220. In one embodiment, the local memory 520 includes on-chip DRAM used to store image data. In another embodiment, the local memory 520 includes a cache associated with off-chip DRAM accessible by the scaling unit 230 via an interface. Image data may be stored in the off-chip DRAM and fetched into the cache as needed.

The scaler 510 may receive each frame of image data at a resolution generated by the GPU 250. The scaler 510 may determine the resolution of the frames of image data by analyzing the video signal (i.e., counting the number of pixels between horizontal synchronization signals and/or vertical synchronization signals), or the scaler 510 may receive a configuration signal from the GPU 250 over the interface 240 that specifies a resolution of the frames of image data transmitted over the interface 240. The scaler 510 may then scale the frames of image data from the original resolution provided by the GPU 250 to the native resolution of the display 210. When the original resolution matches the native resolution, then no scaling of the image data may be required. The scaled image data may be generated via, e.g., interpolating one or more values in the original image data to generate values for each pixel location in the scaled image data at the native resolution. The frames of image data may be stored in the local memory 520 and filtered (e.g., interpolated, etc.) to generate scaled image data for the TCON 220 to be displayed on the LCD panel 216.

In one embodiment, the scaling unit 230 is also configured to manage dynamic frame repetition based on the minimum and maximum allowed frame durations of the display 210. The display 210 may be configured to ensure that the LCD panel 216 is refreshed at a rate that falls between the lower and upper bounds for the refresh frequency of the display, even though the incoming video signal may not adhere to these requirements. In such an embodiment, the GPU 250 may be configured to simply transmit the frames of image data to the display 210 when the frames of image data have been fully rendered into the frame buffer. Each frame of image data may only be transmitted to the display 210 one time. Once the scaling unit 230 has caused a previous frame of image data to be presented on the LCD panel 216, the scaling unit 230 may calculate an estimate for the current frame duration.

In one embodiment, the scaling unit 230 determines the frame durations associated with each frame of image data included in the video signal by calculating a delay between the start of each frame of image data received by the scaling unit 230 via the interface 240, utilizing, e.g., a system clock included in the display 210 and timestamps associated with the frames of image data stored in the memory 420. The start of each frame of image data may be characterized by a vertical synchronization signal included in the video signal that cause the display 210 to store a timestamp in the memory 420 that indicates a time associated with the start of that frame of image data.

In another embodiment, the GPU 250 transmits metadata associated with each frame that includes the frame duration for the previous frame of image data in the video signal transmitted via the interface 240. The scaling unit 230 reads the frame durations from the video signal and determines an estimate fir the current frame duration based on one or more frame durations received in the video signal. Once the scaling unit 230 has determined an estimate for the current frame duration, the scaling unit 230 may calculate minimum and maximum repetition values for the previous frame of image data as well as select a repetition value that falls within the calculated range.

Then the scaling unit 230 may cause the scaled image data for the previous image frame to be repeatedly transmitted to the TCON 220 to cause the scaled image data for the previous image frame to be repeatedly presented on the LCD panel 216. The number of times the scaling unit 230 transmits the scaled image data for the previous frame to the TCON 220 depends on the repetition value. Again, if the estimate for the current frame duration calculated by the scaling unit 230 is incorrect (i.e., the next frame of image data is received via the interface 240 either before or after the estimated arrival time), then the scaling unit 230 may transmit the scaled image data for the previous image frame to the TCON 220 either a fewer or greater number of times than initially planned based on the repetition value.

Figure 6:
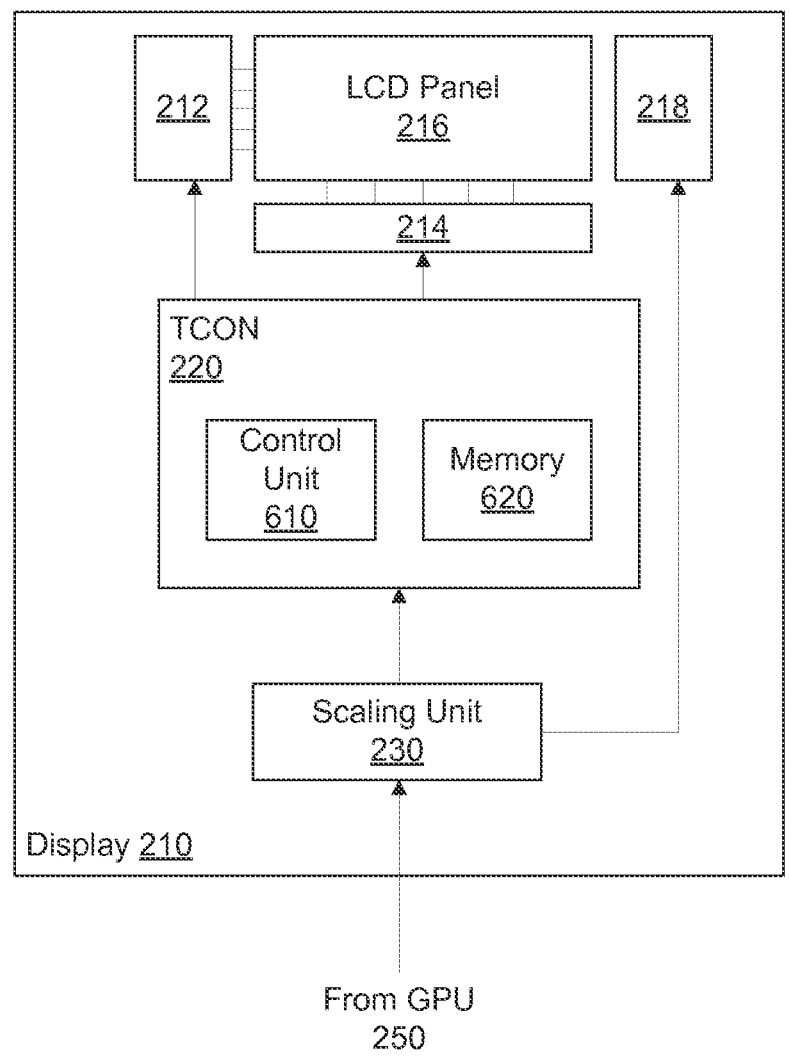
FIG. 6 illustrates the operation of the TCON of FIG. 2, in accordance with another embodiment.

FIG. 6 illustrates the operation of the TCON 220 of FIG. 2, in accordance with another embodiment. In yet another embodiment, the logic for ensuring that the display device refreshes the LCD panel 216 within the lower and upper bounds for the refresh frequency of the display device is implemented within the TCON 220 instead of the scaling unit 230.

The TCON 220 includes a control unit 610 and memory 620. The memory 620 may include DRAM and/or registers. The TCON 220 may be a fixed function hardware unit embodied on an ASIC (application specific integrated circuit) included in the display 210. In another embodiment, the TCON 220 may be included on a larger ASIC that includes the scaling unit 230. The control unit 610 is configured to transmit signals to the row drivers 212 and column drivers 214 based on the scaled image data received from the scaling unit 230. The TCON 220 receives a frame of scaled image data from the scaling unit 230, where the frame of scaled image data is received in, e.g., row major order one component value at a time. The control unit 610 then addresses specific pixels utilizing the row drivers 212 and column drivers 214 to change the value of each pixel in the LCD panel 216 based on the scaled image data.

Once the TCON 220 has caused the frame of scaled image data for the previous image frame to be presented on the LCD panel 216, the TCON 220 may calculate an estimate for the current frame duration in a similar fashion to the manner implemented by the scaling unit 230, described above. In other words, the TCON 220 may calculate delay times between receiving each frame of scaled image data from the scaling unit 230 and then estimate the current frame duration based on the delay times associated with one or more previous frames of scaled image data. The TCON 220 may then use this estimate of the current frame duration to calculate minimum and maximum repetition values for the previous frame of image data as well as select a repetition value that falls within the calculated range. Finally, the TCON 220 may cause the previous frame of scaled image data to be repeatedly presented on the LCD panel 216 based on the maximum repetition value.

In one embodiment, the TCON 220 may be associated with a refresh buffer that stores the scaled image data for the previous image frame as the scaled image data is received from the scaling unit 230. The refresh buffer may be implemented on the ASIC in memory 620. In another embodiment, the refresh buffer may be implemented in off-chip memory accessible by the TCON 220 via a cache in memory 620 and a memory interface. For example, the refresh buffer may be implemented within an external DRAM and portions of the refresh buffer may be fetched into a cache in memory 620 as needed. The stored scaled image data may then be read by the TCON 220 in order to present the previous image frame on the LCD panel 216 one or more additional times.

Alternatively, the refresh buffer may be managed by the scaling unit 230. Instead of reading the scaled image data from a memory accessible by the TCON 220, the TCON 220 may be configured to transmit a signal to the scaling unit 230 that causes the scaling unit 230 to retransmit the scaled image data for the previous image frame to the TCON 220 such that the previous image frame is refreshed to the LCD panel 216. In other words, the memory 520 associated with the scaling unit 230 may be utilized to implement the refresh buffer instead of storing the scaled image data redundantly.

It will be appreciated that, as described above, adjusting the dynamic refresh frequency of the display device based on an estimate of the current frame duration may be implemented by any one of the GPU 250, the scaling unit 230 of the display 210, or the TCON 220 of the display 210. Furthermore, the various embodiments described above may be implemented in the graphics processor 706 and display 708 of system 700, described below.

Figure 7:
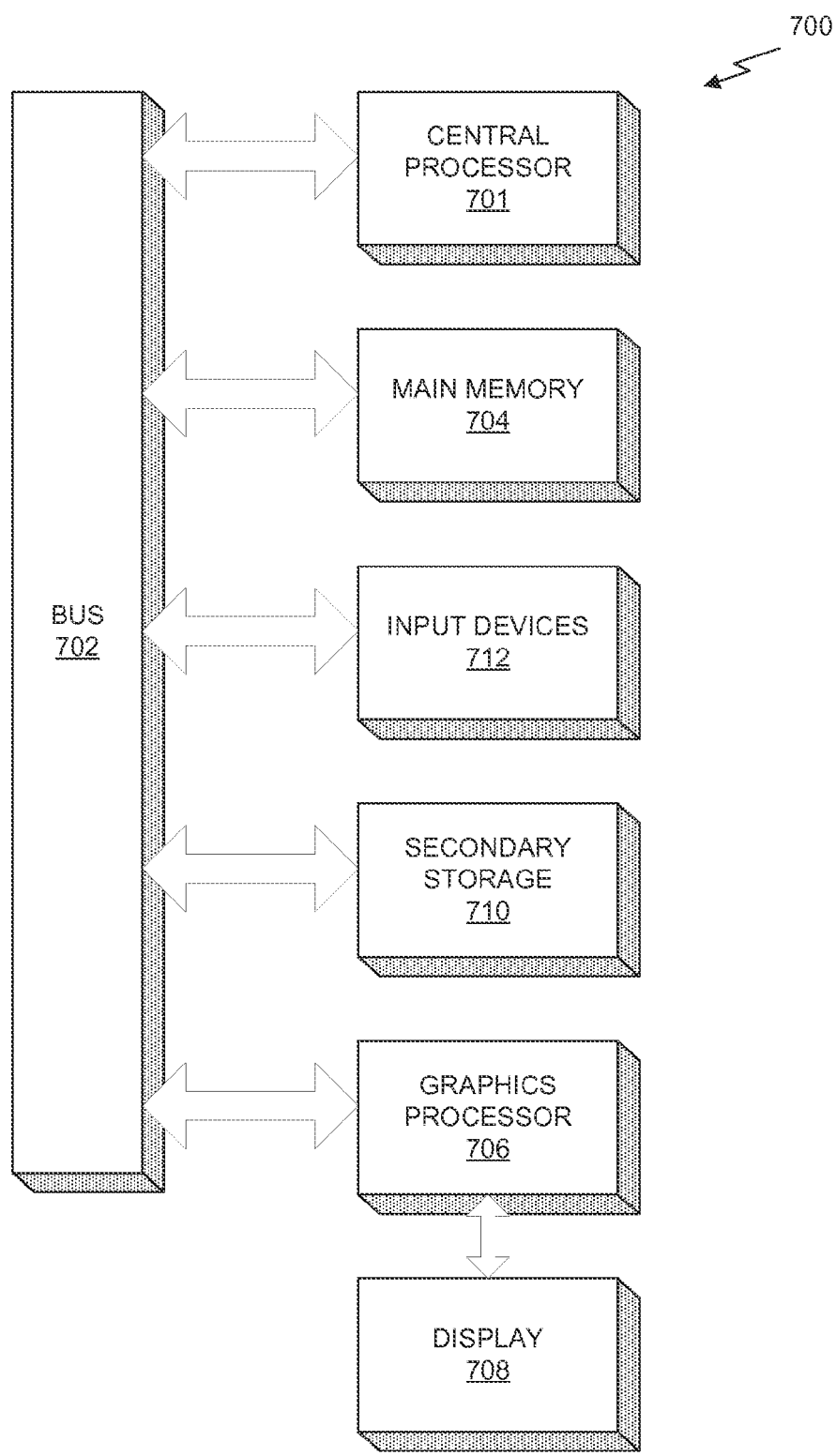
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation, Thus, the breadth and scope of a preferred embodiment should not be limited by any of the above-described exemplary embodiments, but should be defined only in accordance with the following claims and their equivalents.

What is claimed is:

1. A method, comprising:
   presenting a first frame of image data on a display device utilizing a dynamic refresh frequency, the display device configured to operate synchronously with a processing unit configured to generate image data for presentation on the display device;
   calculating an estimate for a current frame duration, wherein the current frame duration represents a time required to render, by the processing unit, a second frame of image data into a frame buffer;
   determining a repetition value based on the current frame duration, a minimum allowed frame duration for the display device, and a maximum allowed frame duration for the display device; and
   repeating presentation of the first frame of image data on the display device based on the repetition value.

2. The method of claim 1, wherein the display device is one of a liquid crystal display (LCD), a light emitting diode (LED) display, an organic light emitting diode (OLED) display, and an active-matrix OLED (AMOLED) display.

3. The method of claim 2, wherein presenting the first frame of image data on the display device comprises refreshing a plurality of pixels in response to receiving the first frame of image data via a video interface, and wherein repeating presentation of the first frame of image data on the display device comprises refreshing the plurality of pixels with the first frame of image data a number of times equal to the repetition value.

4. The method of claim 1, wherein calculating an estimate for the current frame duration comprises calculating a rendering time associated with the second frame of image data.

5. The method of claim 1, wherein calculating an estimate for the current frame duration comprises calculating an average rendering time associated with N previous frames of image data.

6. The method of claim 1, wherein determining the repetition value comprises calculating a maximum repetition value by dividing the current frame duration by the minimum allowed frame duration for the display device to generate a first intermediate result, rounding the first intermediate result down to the nearest integer value to generate a first rounded result, and subtracting one from the first rounded result to generate the maximum repetition value.

7. The method of claim 6, wherein determining the repetition value comprises calculating a minimum repetition value by dividing the current frame duration by the maximum allowed frame duration for the display device to generate a second intermediate result, rounding the second intermediate result up to the nearest integer value to generate a second rounded result, and subtracting one from the second rounded result to generate the minimum repetition value.

8. The method of claim 7, wherein determining the repetition value comprises selecting the repetition value as an integer greater than or equal to the minimum repetition value and less than or equal to the maximum repetition value.

9. The method of claim 1, wherein the processing unit is a graphics processing unit (GPU) configured to:
   calculate the estimate for the current frame duration; and
   determine the repetition value.

10. The method of claim 9, wherein the GPU is further configured to cause the presentation of the first frame of image data to be repeated on the display device by re-encoding the first frame of image data in a video signal transmitted to the display device via an interface.

11. The method of claim 1, wherein a scaling unit of the display device is configured to:
    calculate the estimate for the current frame duration; and
    determine the repetition value.

12. The method of claim 1, wherein a timing controller of the display device is configured to:
    calculate the estimate for the current frame duration; and
    determine the repetition value.

13. A non-transitory computer-readable storage medium storing instructions that, when executed by a processor, cause the processor to perform steps comprising:
    presenting a first frame of image data on a display device utilizing a dynamic refresh frequency, the display device configured to operate synchronously with a processing unit configured to generate image data for presentation on the display device;

calculating an estimate for a current frame duration, wherein the current frame duration represents a time required to render, by the processing unit, a second frame of image data into a frame buffer;

determining a repetition value based on the current frame duration, a minimum allowed frame duration for the display device, and a maximum allowed frame duration for the display device; and repeating presentation of the first frame of image data on the display device based on the repetition value.

14. The non-transitory computer-readable storage medium of claim 13, wherein calculating an estimate for the current frame duration comprises calculating a rendering time associated with the second frame of image data.

15. The non-transitory computer-readable storage medium of claim 13, wherein determining the repetition value comprises calculating a maximum repetition value by dividing the current frame duration by the minimum allowed frame duration for the display device to generate a first intermediate result, rounding the first intermediate result down to the nearest integer value to generate a first rounded result, and subtracting one from the first rounded result to generate the maximum repetition value.

16. The non-transitory computer-readable storage medium of claim 15, wherein determining the repetition value comprises:

calculating a minimum repetition value by dividing the current frame duration by the maximum allowed frame duration for the display device to generate a second intermediate result, rounding the second intermediate result up to the nearest integer value to generate a second rounded result, and subtracting one from the second rounded result to generate the minimum repetition value; and selecting the repetition value as an integer greater than or equal to the minimum repetition value and less than or equal to the maximum repetition value.

17. A system, comprising:

a processor configured to:

present a first frame of image data on a display device utilizing a dynamic refresh frequency, the display device configured to operate synchronously with a processing unit configured to generate image data for presentation on the display device;

calculate an estimate for a current frame duration, wherein the current frame duration represents a time required to render, by the processing unit, a second frame of image data into a frame buffer;

determine a repetition value based on the current frame duration, a minimum allowed frame duration for the display device, and a maximum allowed frame duration for the display device, and repeat presentation of the first frame of image data on the display device based on the repetition value.

18. The system of claim 17, wherein calculating an estimate for the current frame duration comprises calculating a rendering time associated with the second frame of image data.

19. The system of claim 17, wherein the processing unit is a graphics processing unit (GPU).

20. The system of claim 17, wherein the processor is one of a scaling unit included in the display device and a timing controller included in the display device.

* * * * *